US010034161B2

(12) United States Patent
Bakshi et al.

(10) Patent No.: US 10,034,161 B2
(45) Date of Patent: Jul. 24, 2018

(54) SYSTEM AND METHOD FOR PROVIDING INTERNET CONNECTIVITY TO RADIO FREQUENCY DEVICES WITHOUT INTERNET FACILITY THROUGH SMART DEVICES

(71) Applicants: Karan Singh Bakshi, Reston, VA (US); Durlabh Jain, Reston, VA (US)

(72) Inventors: Karan Singh Bakshi, Reston, VA (US); Durlabh Jain, Reston, VA (US)

( * ) Notice: Subject to any disclaimer, the term of this patent is extended or adjusted under 35 U.S.C. 154(b) by 34 days.

(21) Appl. No.: 15/073,357

(22) Filed: Mar. 17, 2016

(65) Prior Publication Data
US 2016/0198334 A1 Jul. 7, 2016

(51) Int. Cl.
| | | |
|---|---|---|
| *H04W 8/00* | (2009.01) | |
| *H04W 76/14* | (2018.01) | |
| *H04W 84/18* | (2009.01) | |
| *H04W 88/04* | (2009.01) | |
| *H04W 4/38* | (2018.01) | |
| *H04W 4/70* | (2018.01) | |
| *H04W 4/80* | (2018.01) | |

(52) U.S. Cl.
CPC .......... *H04W 8/005* (2013.01); *H04W 76/14* (2018.02); *H04W 4/38* (2018.02); *H04W 4/70* (2018.02); *H04W 4/80* (2018.02); *H04W 84/18* (2013.01); *H04W 88/04* (2013.01)

(58) Field of Classification Search
CPC .............................. H04W 8/005; H04W 76/14
USPC .......................................... 370/254–258, 338
See application file for complete search history.

(56) References Cited

U.S. PATENT DOCUMENTS

| | | | | |
|---|---|---|---|---|
| 6,487,406 B1* | 11/2002 | Chang | ................... | H04W 92/02 370/401 |
| 9,137,347 B1* | 9/2015 | Lee | .......................... | H04M 1/66 |
| 2003/0134622 A1* | 7/2003 | Hsu | ...................... | H04W 76/002 455/414.1 |
| 2007/0089110 A1* | 4/2007 | Li | ....................... | H04L 67/2847 717/178 |
| 2011/0307561 A1* | 12/2011 | Gao | ....................... | H04H 20/42 709/206 |
| 2012/0170552 A1* | 7/2012 | Oprescu-Surcobe | . | H04W 28/16 370/332 |
| 2013/0316727 A1* | 11/2013 | Edge | ...................... | H04W 4/02 455/456.1 |

(Continued)

*Primary Examiner* — Thai Hoang
(74) *Attorney, Agent, or Firm* — Barry Choobin; Patent 360

(57) ABSTRACT

The embodiments herein provide a communication system and method for providing internet connectivity with Radio Frequency (RF) devices that are not provided with internet connectivity through smart communication devices. The system comprises Radio Frequency (RF) devices configured to generate a data in a form of RF signals, at least an internet enabled device configured for providing an internet connectivity to the RF device and a cloud server and/or a web server in communication with the internet enabled device, configured for uploading and downloading the data from the RF devices. The communication of data between the RF devices and the cloud/web server is achieved using the internet connectivity of the internet enabled device. An incentive is associated with a usage of the internet enabled device which earns reward points for transmitting the data from each RF device to the cloud server and the web server.

16 Claims, 5 Drawing Sheets

(56) References Cited

U.S. PATENT DOCUMENTS

| | | | |
|---|---|---|---|
| 2015/0148104 A1* | 5/2015 | Friedl | G06Q 20/145 455/561 |
| 2015/0296004 A1* | 10/2015 | Goel | H04L 67/104 709/204 |
| 2015/0341233 A1* | 11/2015 | Marri Sridhar | G01S 5/0252 370/252 |
| 2016/0155150 A1* | 6/2016 | Zhang | G06Q 30/0261 705/14.58 |
| 2016/0286410 A1* | 9/2016 | O'Malley | G06Q 30/06 |
| 2016/0381630 A1* | 12/2016 | Krishnamoorthy | H04W 36/08 370/329 |

\* cited by examiner

SYSTEM AND METHOD FOR PROVIDING INTERNET CONNECTIVITY TO RADIO FREQUENCY DEVICES WITHOUT INTERNET FACILITY THROUGH SMART DEVICES

BACKGROUND

Technical Field

The embodiments herein generally relate to a field of internet communication. The embodiments herein particularly relates to a system and method of providing internet connectivity to communication devices not provided with internet connectivity. The embodiments herein more particularly relate to a system and method of providing internet connectivity to Radio Frequency (RF) devices through smart communication devices.

Description of the Related Art

A short-range RF device is a low power consuming device that compute and communicate using only the power that they harvest from RF signals. While the existing technologies have harvested power from ambient RF sources (such as TV broadcasts), the RF communication devices require a dedicated gateway (like an RFID reader) for Internet connectivity. The low energy RF devices such as BLE Beacons, Wireless Sensors, Smart Devices and custom RF modules use the gateway for collecting and uploading the data to the cloud/webservers. Using the conventional radio communication systems to achieve the internet connectivity is challenging, since it consumes more power in the orders of magnitude than that is available in ambient RF. All the current technologies that are used by the gateway for providing internet connectivity, require high power consumption and cannot work on batteries for extended period of time. Even when an external power is used as an option, the devices are costly which makes them unfeasible for many use cases.

In the view of aforementioned drawbacks, there is a need for a communication system that solves the issue of providing internet connectivity for low power consuming RF devices. There is further a need for a system that eliminates the need for a high power consuming gateway to provide the internet connectivity in the RF device.

Hence there is a need for a system and method of providing internet connectivity to Radio Frequency (RF) devices through smart communication devices. Further there is a need for developing smart devices for providing internet connectivity to Radio Frequency (RF) devices and to receive rewards and incentives for providing internet connectivity to internet disabled devices.

The above mentioned shortcomings, disadvantages and problems are addressed herein and which will be understood by reading and studying the following specification.

OBJECTS OF THE EMBODIMENTS HEREIN

The primary object of the embodiments herein is to provide a system and method of providing internet connectivity to Radio Frequency (RF) devices through smart communication devices.

Another object of the embodiments herein is to develop an efficient communication system that is implemented in a low power consuming Radio Frequency device.

Yet another object of the embodiments herein is to develop and deploy a system for connecting the RF devices and a cloud infrastructure.

Yet another object of the embodiments herein is to provide a cost effective system which eliminates a need for dedicated data communication devices in the low power RF devices.

Yet another object of the embodiments herein is to reuse an existing infrastructure to connect the RF devices to the Internet.

Yet another object of the embodiments herein is to provide rewards and incentives to smart devices used for providing internet connectivity to Radio Frequency (RF) devices not provided with internet connectivity.

These and other objects and advantages of the embodiments herein will become readily apparent from the following summary and the detailed description taken in conjunction with the accompanying drawings.

SUMMARY

The various embodiments herein provide a communication system through the smart devices for providing internet connectivity to RF devices that are not internet ready and not provided with internet connectivity. According to an embodiment herein, a system and method is developed for providing an internet connectivity with Radio Frequency (RF) devices that are not provided with internet connectivity through smart communication devices.

According to one embodiment herein, a system is developed for providing internet connectivity to Radio Frequency (RF) devices through smart communication devices. The system comprises a plurality of Radio Frequency (RF) devices capable of generating data in a form of RF signals, at least an internet enabled device configured for providing an internet connectivity to the RF device and a cloud server and/or a web server in communication with the internet enabled device, that is configured for uploading and downloading the data from the plurality of RF devices. The communication of data between the RF devices and the cloud/web server is achieved using the internet connectivity of the internet enabled device.

According to an embodiment herein, the data from the RF device communicates with the internet enabled device using low energy protocols.

According to an embodiment herein, an application is installed on the internet enabled device. The application is used for communicating the data received from RF device to the cloud server and the web server.

According to an embodiment herein, the application on the internet enabled device scans for the RF devices in a vicinity of the internet enabled device.

According to an embodiment herein, each RF device comprises a unique identification number configured to identify the RF device. The RF device broadcast the unique identification number to the internet enabled device in vicinity to the RF device.

According to an embodiment herein, the internet enabled device transmits the unique identification number to the cloud server and/or the web server for authentication of the RF device, According to an embodiment herein, the cloud server and/or web server provides a password to the internet enabled device. The internet enabled device establishes a connection between the RF device and the cloud server and/or the web server using the password.

According to an embodiment herein, an incentive is associated with a usage of the application on the internet enabled device. The application earns reward points for transmitting the data from each RF device to the cloud server and the web server.

According to an embodiment herein, the RF device in proximity with the internet enabled device adopts a mesh protocol for collecting data from the plurality of RF devices outside the range of the internet enabled device. The internet enabled device is configured to forwarding the collected data to the cloud server and/or the web server.

According to an embodiment herein, the cloud server and/or the web server is configured to transmit a plurality of commands for changing a plurality of settings in the RF devices.

The various embodiments herein disclose a method for providing internet connectivity to Radio Frequency (RF) devices through smart communication devices. The method comprises the steps of: generating data in the form of RF signals using the plurality of RF devices, providing the internet connectivity to the plurality of RF devices using the internet enabled device for the communicating the data from the RF devices and uploading and downloading the data from the plurality of RF device to the cloud server and/or the web server. The method provides a smart device for communicating the data between the RF devices and the cloud/web server using the internet connectivity of the internet enabled device.

According to an embodiment herein, transmitting the data from the RF device to the internet enabled device is accomplished using low energy protocols.

According to an embodiment herein, the method further comprises the steps of installing an application on the internet enabled device, and employing the application for communicating the data received from RF device to the cloud server and/or the web server.

According to an embodiment herein, the method further comprises scanning for the RF devices in vicinity of the internet enabled device, and the scanning is performed by the application on the internet enabled device.

According to an embodiment herein, the method further comprises broadcasting the unique identification number of the RF device to the internet enabled device and identifying the RF device using the identification number.

According to an embodiment herein, the method further comprises transmitting the unique identification number from the internet enabled device to the cloud server and/or the web server and authenticating the RF device.

According to an embodiment herein, the method further comprises steps of transmitting the password from the cloud server and/or the web server, receiving the password at the internet enabled device and establishing the connection between the RF device and the cloud server and/or the web server using the password.

According to an embodiment herein, the method further comprises associating an incentive with the usage of the application on the internet enabled device and earning reward points for transmitting the data from each RF device to the cloud server and the web server According to an embodiment herein, the method further comprises collecting data from the plurality of RF devices outside the range of the internet enabled device, by the RF device in proximity with the internet enabled device by employing the mesh protocol, and forwarding the collected data to the cloud server and/or the web server using the internet enabled device.

According to an embodiment herein, the method further comprises transmitting a plurality of commands from the cloud server and/or the web server to the internet enable devices, forwarding the commands to the RF devices and changing a plurality of settings in the RF devices depending on the commands.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a communication system through the smart devices for providing internet connectivity to RF devices that are not internet ready and not provided with internet connectivity. According to an embodiment herein, a system and method is developed for providing an internet connectivity with Radio Frequency (RF) devices that are not provided with internet connectivity through smart communication devices.

According to one embodiment herein, a system is developed for providing internet connectivity to Radio Frequency (RF) devices through smart communication devices. The system comprises a plurality of Radio Frequency (RF) devices capable of generating data in a form of RF signals, at least an internet enabled device configured for providing an internet connectivity to the RF device and a cloud server and/or a web server in communication with the internet enabled device, that is configured for uploading and downloading the data from the plurality of RF devices. The communication of data between the RF devices and the cloud/web server is achieved using the internet connectivity of the internet enabled device.

According to an embodiment herein, the data from the RF device communicates with the internet enabled device using low energy protocols.

According to an embodiment herein, an application is installed on the internet enabled device. The application is used for communicating the data received from RF device to the cloud server and the web server.

According to an embodiment herein, the application on the internet enabled device scans for the RF devices in a vicinity of the internet enabled device.

According to an embodiment herein, each RF device comprises a unique identification number configured to identify the RF device. The RF device broadcast the unique identification number to the internet enabled device in vicinity to the RF device.

According to an embodiment herein, the internet enabled device transmits the unique identification number to the cloud server and/or the web server for authentication of the RF device, According to an embodiment herein, the cloud server and/or web server provides a password to the internet enabled device. The internet enabled device establishes a connection between the RF device and the cloud server and/or the web server using the password.

According to an embodiment herein, an incentive is associated with a usage of the application on the internet enabled device. The application earns reward points for transmitting the data from each RF device to the cloud server and the web server.

According to an embodiment herein, the RF device in proximity with the internet enabled device adopts a mesh protocol for collecting data from the plurality of RF devices outside the range of the internet enabled device. The internet enabled device is configured to forwarding the collected data to the cloud server and/or the web server.

According to an embodiment herein, the cloud server and/or the web server is configured to transmit a plurality of commands for changing a plurality of settings in the RF devices.

The various embodiments herein disclose a method for providing internet connectivity to Radio Frequency (RF) devices through smart communication devices. The method comprises the steps of: generating data in the form of RF signals using the plurality of RF devices, providing the internet connectivity to the plurality of RF devices using the internet enabled device for the communicating the data from the RF devices and uploading and downloading the data from the plurality of RF device to the cloud server and/or the web server. The method provides a smart device for communicating the data between the RF devices and the cloud/web server using the internet connectivity of the internet enabled device.

According to an embodiment herein, transmitting the data from the RF device to the internet enabled device is accomplished using low energy protocols.

According to an embodiment herein, the method further comprises the steps of installing an application on the internet enabled device, and employing the application for communicating the data received from RF device to the cloud server and/or the web server.

According to an embodiment herein, the method further comprises scanning for the RF devices in vicinity of the internet enabled device, and the scanning is performed by the application on the internet enabled device.

According to an embodiment herein, the method further comprises broadcasting the unique identification number of the RF device to the internet enabled device and identifying the RF device using the identification number.

According to an embodiment herein, the method further comprises transmitting the unique identification number from the internet enabled device to the cloud server and/or the web server and authenticating the RF device.

According to an embodiment herein, the method further comprises steps of transmitting the password from the cloud server and/or the web server, receiving the password at the internet enabled device and establishing the connection between the RF device and the cloud server and/or the web server using the password.

According to an embodiment herein, the method further comprises associating an incentive with the usage of the application on the internet enabled device and earning reward points for transmitting the data from each RF device to the cloud server and the web server According to an embodiment herein, the method further comprises collecting data from the plurality of RF devices outside the range of the internet enabled device, by the RF device in proximity with the internet enabled device by employing the mesh protocol, and forwarding the collected data to the cloud server and/or the web server using the internet enabled device.

According to an embodiment herein, the method further comprises transmitting a plurality of commands from the cloud server and/or the web server to the internet enable devices, forwarding the commands to the RF devices and changing a plurality of settings in the RF devices depending on the commands.

Figure 1:
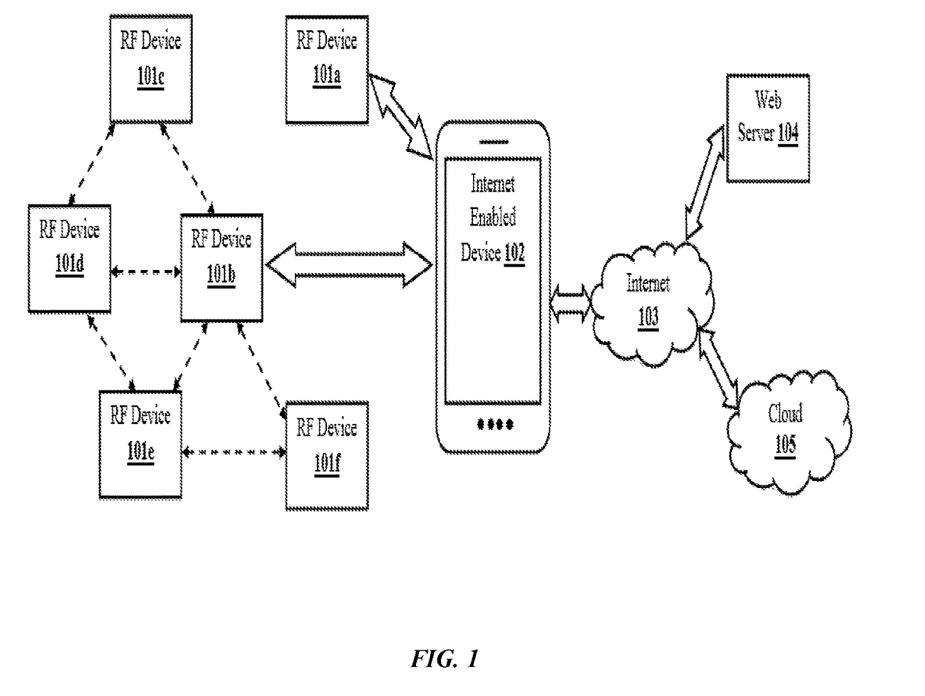
FIG. 1 illustrates a block diagram of a communication system for providing an internet connectivity with Radio Frequency (RF) devices that are not provided with internet connectivity through smart communication devices, according to an embodiment herein.

FIG. 1 illustrates a block diagram of a communication system for providing an internet connectivity with Radio Frequency (RF) devices that are not provided with internet connectivity through smart communication devices, according to an embodiment herein. The communication system comprises a plurality of Radio Frequency (RF) devices 101 in communication with at least an internet enabled device 102. The internet enabled device 102 is further coupled to a cloud server 105 and/or a web server 104 via a communication network, such as the Internet 103. The RF devices 101 include the low power radio communications systems such as Bluetooth Low Energy (BLE) beacon, wireless sensors and actuators, alarms, detectors and the like devices. The RF devices 101 are capable of generating data in a form of RF signals. The RF devices 101 communicate with other devices through a short-range RF wireless communication link. The data from the RF devices 101 is transmitted to the internet enabled device 102 using low energy protocols such as Bluetooth Smart, BLE, RFID and NFC. The internet enabled device 102 is configured for providing an internet connectivity link 103 between the RF device 101 and the servers 104 and 105. The internet enabled device 102 herein refers to any one of the electronic devices such as smartphones, laptops, desktops and the like devices which provide the internet connectivity 103. The RF device 101 communicates with the internet enabled device 102 using the short-range RF wireless communication link, which in-turn communicate with the server 104/105 via the internet connection 103. The cloud server 105 and/or the web server 104 is configured for uploading and downloading the data from the plurality of RF devices 101. The internet enabled device 102 acts as a carrier for the data from the plurality of RF devices 101. The data is transferred between the RF devices 101 and the cloud/web server 104/105 using the internet connectivity 103 of the internet enabled device 102. The RF devices 101 which are outside a connectivity range of the internet enabled device 102 transmits the data to the RF device 101 in proximity with the internet enabled device 102. The data exchange between the RF devices 101 is performed using a mesh protocol. The internet enabled device 102 collects the data from the RF device 101 in vicinity and forwards it to the cloud server 105 and the web server 104. For example, the RF device 101a directly transmits data to the internet enabled device 102 as shown in FIG. 1, whereas the RF device 101d transmits the data to the RF device 101b which in turn transmits the received data to the internet enabled device 102. Similarly the RF device 101f transmits the data to the RF device 101b which forwards the data to the internet enabled device 102.

Figure 2:
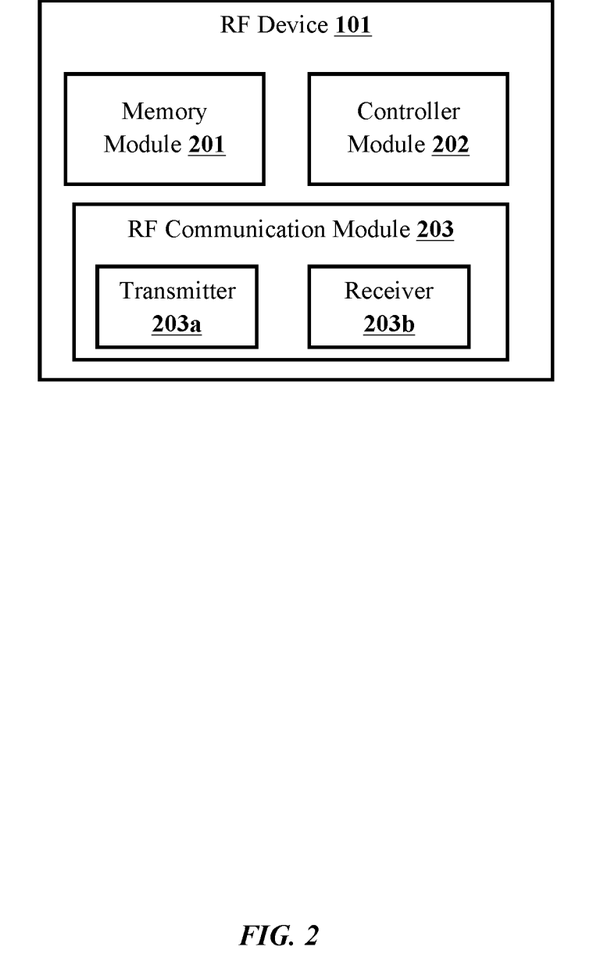
FIG. 2 illustrates a block diagram of a RF device in the communication system for providing an internet connectivity with Radio Frequency (RF) devices that are not provided with internet connectivity through smart communication devices, according to an embodiment herein.

FIG. 2 illustrates a block diagram of a RF device of the communication system for providing an internet connectivity with Radio Frequency (RF) devices that are not provided with internet connectivity through smart communication devices, according to an embodiment herein. The RF device 101 typically comprises a memory module 201 and a controller module 202. The memory module 201 is configured to store a plurality of instruction programs required to operate the controller module 202 as well as the memory module 201 also contains the data that is to be transmitted to the internet enabled device. The RF device 101 further comprises a RF communication module 203 in connection with the controller module 202. The communication module 203 is configured to transmit the data from the memory module to the internet enabled device. The communication module 203 is controlled by the controller module 202. The communication module 203 further comprises a transmitter 203a and a receiver 203b. The transmitter 203a is configured to convert the data into the radio frequency signals and transmit the signals to the internet enabled device 102. The receiver 203b of the communication module 203 is configured to receive the data from the cloud/web server through the internet enabled device. The data received from the internet enabled device is in the form of RF signals. The receiver 203b decodes the RF signals to extract relevant information, wherein the decoded data is further provided to the controller module 202. The controller module 202 operates the RF device 101 according to the received data, whereas the data is also stored in the memory module 201 for future reference.

According to an embodiment herein, each RF device in the communication system is identified by a unique identification number. The unique identification number is accessed by the cloud/web server for authenticating the RF device. The RF device broadcasts the identification number to the internet enabled device which further forwards the identification number to the cloud/web server. The RF device transmits the identification number along with the data to the internet enabled device, else the identification number is transmitted prior to communicating the data to the internet enabled device. The server transmits a command to the internet enabled device in response to the identification number obtained for the RF device. The command is a positive response, when the RF device is identified by the server. The command is a negative report in-case the server is not able to recognize the RF device. Based on the positive command or the negative command, the internet enabled device respectively connects with the RF device or discards the data received from the RF device. In case of a positive authentication of the RF device, the server transmits a password to the internet enabled device. The internet enabled device shares the password with the RF device so as to establish a connection between the RF device and the server. The server is further configured to change a plurality of settings in the RF device for example the server can reset the password of the RF device, delete certain data from the RF device, change configuration of the device, change master data of the device, change device settings/behavior and the like. The changes are made to the RF device through the internet enabled device, and all the changes are recorded at the server.

Figure 3:
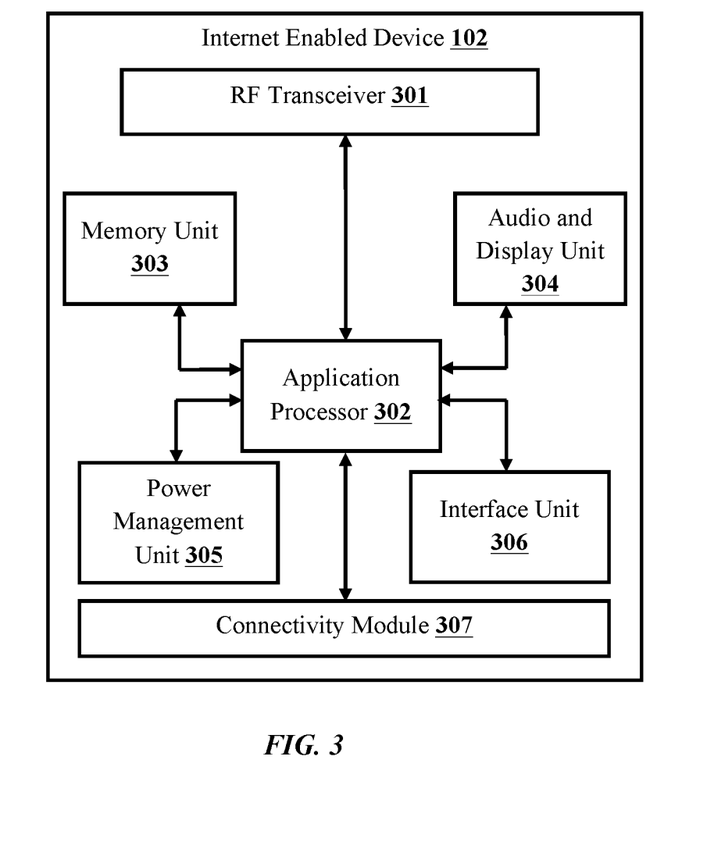
FIG. 3 illustrates a block diagram of an Internet enabled device implemented in the communication system for providing an internet connectivity with Radio Frequency (RF) devices that are not provided with internet connectivity through smart communication devices, according to an embodiment herein.

FIG. 3 illustrates a block diagram of an Internet enabled device implemented in the communication system for providing an internet connectivity with Radio Frequency (RF) devices that are not provided with internet connectivity through smart communication devices, according to an embodiment herein. The internet enabled device 102 comprises an application processor 302 in communication with a memory unit 303, an audio and display unit 304, a power management unit 305 and an interface unit 306. The application processor 302 is configured to operate and control functionalities of various units of the internet enabled device 102. The memory unit 303 is a general purpose memory that is used to store both program instructions executed by the processor 302, as well as data, such as audio data, video data, configuration data, and/or other data that is accessed by the processor 302. The audio and display unit 304 is employed by the application processor 302 to output the data inform of an audio or a video or a text or a pictorial format. A power supply to the internet enabled device 102 is controlled by the power management system 305. The internet enabled device 102 is configured to employ an in-built battery as a power supply. Otherwise an external source is employed to power the internet enabled device 102. The internet enabled device 102 receives inputs from a user through the interface unit 306.

The internet enabled device 102 further comprises a RF transceiver 301 which operates under the control of the application processor. The RF transceiver 301 is configured to communicate with the RF device so as to transmit and receive the identification data and the information data from the RF device. The transceiver 301 encodes the data into RF signals before transmitting to the RF device. And on receiving the RF signals, the RF transceiver 301 decodes the signals to extract the relevant information transmitted by the RF device. The internet enabled device 102 further comprises a connectivity module 307 configured for providing the internet connection to the internet enabled device 102. The connectivity module 307 of a portable internet enabled device 102 comprises a local wireless network unit (Wi-Fi module and Bluetooth module) and/or a cellular communication unit for proving the internet connectivity. The connectivity module 307 of a fixed internet enabled device 102 further comprises a Public Service Telephone Network (PSTN) or "landline" network which communicates with the server via the wireless communication and/or via a wired connection such as a fixed Ethernet connection.

According to an embodiment herein, an application is installed in the internet enabled device. A user executes the application on the application processor so as to operate the internet enabled device as a means for communicating the data received from RF device to the cloud server and the web server. On initiating the execution, the application scans for the RF devices in vicinity of the internet enabled device. The application identifies the plurality of the RF devices inside a connectivity range of the internet enabled device and collects data from the connected devices. The application provides the connection between the plurality of RF devices and the server so that the server uploads and downloads to the RF device using the internet facility of the internet enabled device. The usage of the application on the internet enabled device is associated with an incentive. The incentive is awarded to the user of the application in form of a cash reward, coupons, vouchers, discounts and the like.

To understand the working of the communication system, an example scenario of a gas station is considered. The communication system comprises a mobile phone utilized as the internet enabled device. A plurality of beacons installed at the gas stationed are the RF devices which are to be connected to the cloud. The user downloads the connectivity application on the mobile phone prior to entering the gas station. On arrival at the gas station, the user opens the application on the mobile and identifies all the nearby beacons. The application is executed establish a connection between the beacons and the cloud. The application on the mobile collects data from all the beacons and transmits the data to the cloud using the mobile's data connection or the Wi-Fi connection. Further the server communicates with the beacons using the internet connectivity of the mobile phone. Depending on the amount of the data communication between the beacons and the cloud, the user is credited with the incentives.

Figure 4:
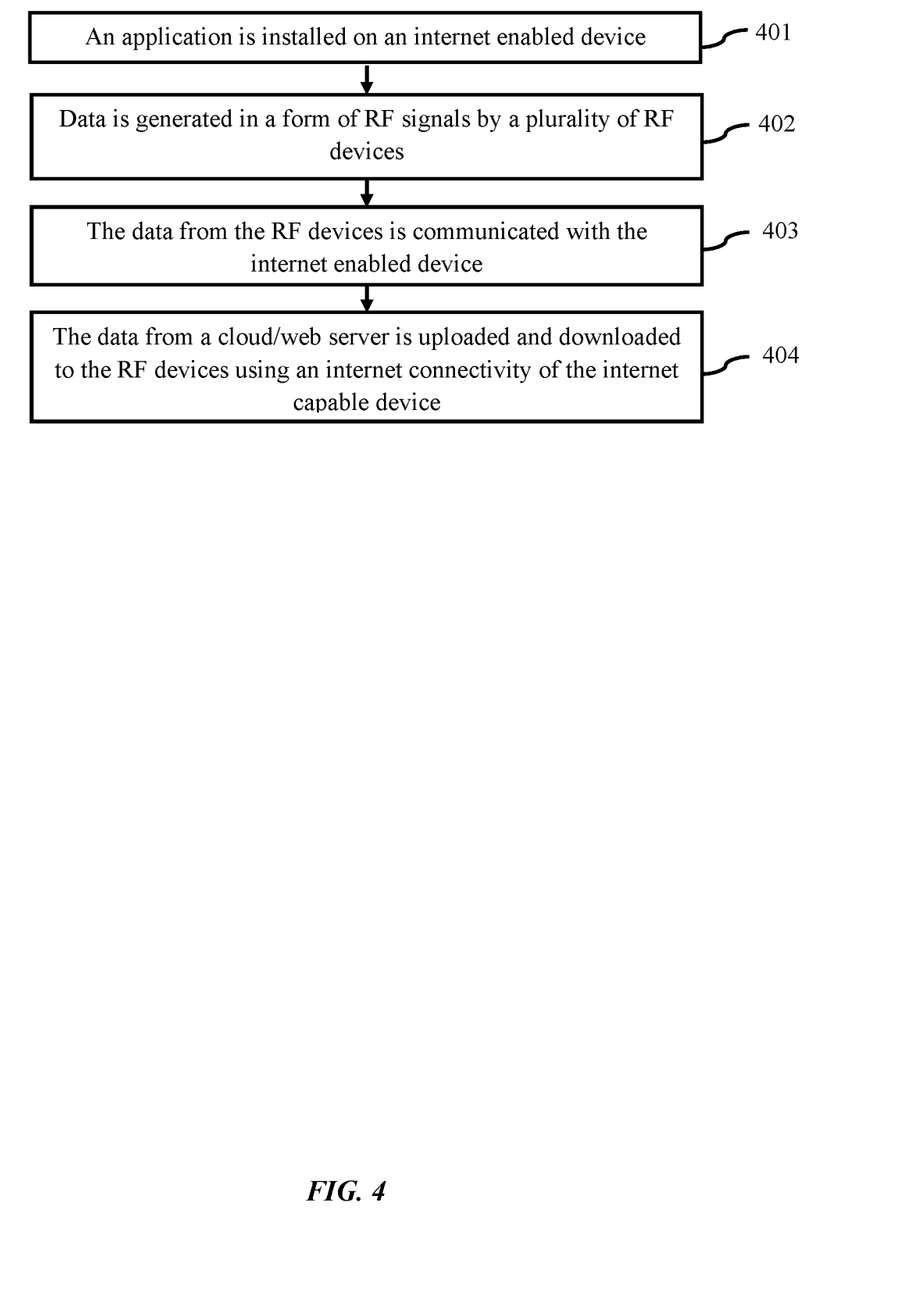
FIG. 4 illustrates a flowchart explaining the steps in a method for providing an internet connectivity with Radio Frequency (RF) devices that are not provided with internet connectivity through smart communication devices, according to an embodiment herein.

FIG. 4 illustrates a flowchart indicating the steps involved in a method for operating the communication system for providing an internet connectivity with Radio Frequency (RF) devices that are not provided with internet connectivity through smart communication devices, according to an embodiment herein. Initially, the application is installed on the internet enabled device (401). The application is executed on the internet enabled device so as to connect the device to the plurality of RF devices (402). The RF devices generate the data to be transmitted in the form of RF signals (403). The data from the RF devices is communicated with the internet enabled device (404). The data from the cloud/web server is uploaded and downloaded to the RF devices using the internet connectivity of the internet enabled device (404).

Figure 5:
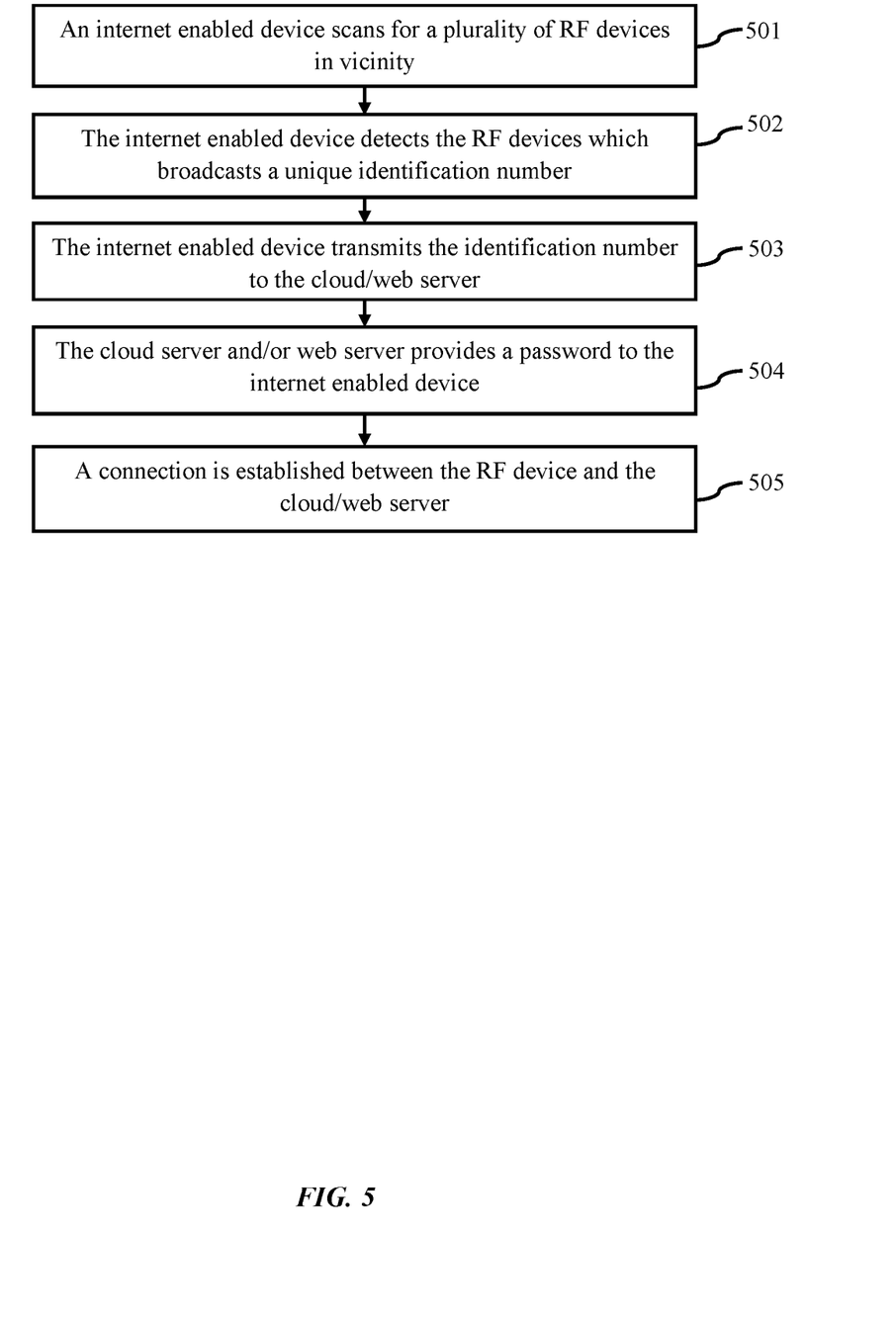
FIG. 5 illustrates a flowchart explaining the steps involved in a method for authenticating the RF devices in the communication system for providing an internet connectivity with Radio Frequency (RF) devices that are not provided with internet connectivity through smart communication devices, according to an embodiment herein.

FIG. 5 illustrates a flowchart indicating the steps involved in a method for authenticating the RF devices of the communication system, according to an embodiment herein. On initiation of the application on the internet enabled device, the application scans for a plurality of RF devices in vicinity of the device (501). The internet enabled device detects the RF device which broadcasts the unique identification number (502). The internet enabled device transmits the identification number of the RF device to the cloud/web server (503). On positive authentication of the RF device, the server provides a password to the internet enabled device (504). The internet enabled device uses the password to establish the internet connection between the RF device and the cloud/web server (505).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A communication system for providing an internet connectivity with Radio Frequency (RF) devices that are not provided with internet connectivity through communication devices, the system comprising:
    a plurality of Radio Frequency (RF) devices configured to generate data in a form of RF signals;
    at least an internet enabled device configured for providing an internet connectivity to the plurality of RF devices;
    a cloud server and/or a web server in communication with the internet enabled device, configured for uploading and downloading the data from the plurality of RF devices; and
    wherein a communication of data between the RF devices and the cloud server and/or a web server is achieved using the internet connectivity of the internet enabled device, and wherein the data from the RF device is transmitted to the internet enabled device using a protocol, and wherein the protocol is selected from a group consisting of Bluetooth, Bluetooth low energy beacon, Radio Frequency Identification system, and Near Field Communication, and wherein the plurality of RF devices which are outside a connectivity range of the internet enabled device are configured to transmit the data to the RF device which is in proximity to the internet enabled device, and wherein the RF device in proximity with the internet enabled device adopts a mesh protocol for collecting data from the plurality of RF devices outside the range of the internet enabled device, and wherein the internet enabled device is configured to forwarding the collected data to the cloud server and/or the web server.

2. The system according to claim 1, wherein an application is installed on the internet enabled device, and wherein the application is used for communicating the data received from RF device to the cloud server and/or a web server.

3. The system according to claim 1, wherein the application on the internet enabled device scans for the RF devices in a vicinity of the internet enabled device.

4. The system according to claim 1, wherein each RF device comprises a unique identification number configured to identify the RF device, and wherein the RF device broadcasts the unique identification number to the internet enabled device in vicinity to the RF device.

5. The system according to claim 1, wherein the internet enabled device transmits a unique identification number to the cloud server and/or the web server for authentication of the RF device.

6. The system according to claim 1, wherein the cloud server and/or web server provides a password to the internet enabled device, and wherein the internet enabled device establishes a connection between the RF device and the cloud server and/or the web server using the password.

7. The system according to claim 1, wherein an incentive is associated with a usage of the application on the internet enabled device, and wherein the application is configured to acquire reward points for transmitting the data from each RF device to the server and/or a web server.

8. The system according to claim 1, wherein the cloud server and/or the web server is configured to transmit a plurality of commands for changing a plurality of settings in the RF devices.

9. A method for providing an internet connectivity with Radio Frequency (RF) devices that are not provided with internet connectivity through communication devices in a communication system, wherein the method comprises steps of:
   generating data in a form of RF signals using a plurality of RF devices;
   providing an internet connectivity to the plurality of RF devices using an internet enabled device, for the communicating the data received from the RF devices;
   uploading and downloading the data from the plurality of RF device to a cloud server and/or a web server, and wherein the data is communicated between the RF devices and the cloud server and/or a web server using the internet connectivity of the internet enabled device, and wherein the data from the RF device is communicated to the internet enabled device using a protocol, and wherein the protocol is selected from a group consisting of Bluetooth, Bluetooth low energy beacon, Radio Frequency Identification system, and Near Field Communication;
   collecting data from the plurality of RF devices outside the range of the internet enabled device, by the RF device in proximity with the internet enabled device by employing a mesh protocol, and forwarding the collected data to the cloud server and/or the web server using the internet enabled device.

10. The method according to claim 9, further comprises steps of installing an application on the internet enabled device, and employing the application for communicating the data received from RF device to the cloud server and/or the web server.

11. The method according to claim 9, further comprises scanning for the RF devices in vicinity of the internet enabled device, and wherein scanning is performed by the application on the internet enabled device.

12. The method according to claim 9, further comprises the steps of broadcasting a unique identification number of the RF device to the internet enabled device and identifying the RF device using the identification number.

13. The method according to claim 9, further comprises the steps of transmitting a unique identification number from the internet enabled device to the cloud server and/or the web server and authenticating the RF device.

14. The method according to claim 9, further comprises the steps of transmitting a password from the cloud server and/or the web server, receiving the password at the internet enabled device and establishing a connection between the RF device and the cloud server and/or the web server using the password.

15. The method according to claim 9, further comprises the steps of associating an incentive with a usage of the application on the internet enabled device and earning reward points for transmitting the data from each RF device to the cloud server and/or a web server.

16. The method according to claim 9, further comprises the steps of transmitting a plurality of commands from the cloud server and/or the web server to the internet enable devices, forwarding the commands to the RF devices and changing a plurality of settings in the RF devices depending on the commands.

* * * * *